Patented June 12, 1951

2,556,387

UNITED STATES PATENT OFFICE 2,556,387

METHOD OF INHIBITING THE CORROSION OF FERROUS EQUIPMENT USED IN THE REGENERATION AND BOILING OF ALKALI METAL SOLUTIONS

George W. Ayers, Chicago, Erskine E. Harton, Evanston, and Louis R. Mazurk, Chicago, Ill., assignors to The Pure Oil Company, Chicago, Ill., a corporation of Ohio No Drawing. Application April 28, 1948, Serial No. 23,868

11 Claims. (Cl. 23—184)

The present invention relates to a method of reducing the corrosion of ferrous metals in equipment for the processing and handling of solutions containing large percentages of caustic alkali. Specifically, the invention embodies a method of inhibiting the corrosion of ferrous equipment used in the regeneration and boiling of alkali solutions containing large amounts of alkali, solubility promoters and oxidation catalysts for the sweetening of hydrocarbon oils.

Experience in the treating of hydrocarbons with solutions containing large amounts of alkali has developed the fact that when the solution comes to be regenerated, it contains not only the alkali and the aqueous solvent therefor, but also various sulfur compounds, perhaps a certain amount of dissolved oxygen, various bits of extraneous matter, a solubility promoter and in some cases an oxidation catalyst, which is used for the sweetening operation. The boiling to which this solution is subjected in the regeneration operation subjects the ferrous equipment in which it is handled to conditions, such that severe corrosion thereof takes place and results in the formation of precipitates in the solution which render it colored and so dirty that it can become unusable.

Accordingly, it is a fundamental object of the present invention to provide a method of preventing the corrosion which takes place in the boiling of strong alkali solutions.

A second object of the invention is to provide a method of preventing corrosion of equipment used in the regeneration of alkali sweetening solutions which have been used in the treatment of hydrocarbons.

A further object of the invention is to provide a method of inhibiting the corrosion occurring upon the regeneration of alkali solutions and maintaining the solutions in clear, clean useful condition.

Other objects and advantages of the invention will in part be obvious and in part appear hereinafter.

The invention, accordingly, comprises the process involved in protecting ferrous equipment against corrosion by the addition to solutions treated therein of certain small amounts of alkali metal nitrates, which process includes the several steps to be described and the relation of one or more such steps to each of the others thereof, which will be exemplified in the method hereinafter set forth and defined in the claims.

We have found that the incorporation and maintenance of small amounts of alkali metal nitrates, such as sodium, potassium and lithium nitrates in caustic alkali treating solutions containing large amounts of caustic, extracted sulfur compounds, and, optionally as the treating process may determine, various organic solubility promoters, or accelerators, prevent corrosion of ferrous equipment by the solution when it is aerated or steamed and boiled for regeneration and further prevent the formation of color bodies and solid precipitates in the solution, which not only interfere with the usefulness thereof, but when developed to a certain degree can render the solution unusable.

The type of solution used in the alkali sweetening of hydrocarbons includes generally an aqueous solvent, which may or may not contain an alcohol, 5 to 50 per cent of caustic alkali, and, depending upon the treating process employed, up to about 3 per cent of organic catalytic agent, such as a hydroquinone, catechol, wood tars, aromatic quinone forming compounds, naphthoquinone, and anthraquinone and derivatives of these quinones and quinone forming compounds which have been found useful as accelerators. The solution may also contain various alkali metal salts of phenols and naphthenic acids and isobutyric acid which have the effect of improving the action of the extracting solution. Typical of the processes employing this type of solution in hydrocarbon treatment and also including operations for regeneration thereof are those described in United States Patent 2,292,636 of August 11, 1942, to Lawrence M. Henderson and George W. Ayers, Jr., and 2,297,621 of September 29, 1942, to Lawrence M. Henderson and George W. Ayers, Jr.

The use of various inorganic salts as inhibitors against corrosion in various systems has been disclosed in the prior art. Typical among the processes involving the use of various inorganic salts are those disclosed in the following United States patents: 2,297,666, of September 29, 1942, to Aaron Wacheter, sodium nitrite in oil pipe lines; 2,153,952, of April 11, 1939, to Alfred L. Bayes, sodium nitrate in anti-freeze solutions; 2,135,160, of November 1, 1938, to Herman Beekhuis, sodium dichromate in ammonium nitrate systems.

The state of the art thus outlined emphasizes the fact that the inhibition of corrosion is an empirical phenomenon and particular situations create their own peculiar corrosion problems which require specific solutions. That is, the inhibition of corrosion in a given situation calls for a process custom-tailored to the problem.

Although a given corrosion inhibitor may be known to be useful in a certain application, projection of that inhibitor into what may appear to be an analogous situation will frequently be unsound. Thus, sodium phosphate and sodium chromate, which are very well known inorganic salt corrosion inhibitors, were found to be worse than useless in the corrosion problem solved in the instant case. Sodium nitrate, a compound which has found wide application as a corrosion inhibitor in certain types of systems, is found not only to be valuable as a corrosion inhibitor in the regeneration of heavy caustic solutions, but also serves to keep the solution clear by inhibiting the formation of color bodies and insoluble precipitates.

The applicability of the instant invention to the inhibition of corrosion of ferrous materials by caustic solutions containing various extraneous compounds will be better understood by reference to the following series of examples and tables:

*Example 1.*—A solution made to correspond to the type which might be on hand for regeneration after an extraction operation was made containing 20 per cent by weight of sodium hydroxide, 3 per cent of meta-thiocresol, 76 per cent of water and 1 per cent of sodium nitrate and tested for its corrosiveness on a low carbon steel by placing a strip of the clean metal in the solution and subjecting it to successive two-hour periods of boiling. The boiling temperature was approximately 230° F. Parallel tests were made with plain sodium hydroxide solution and with sodium chromate for comparison with a known corrosion inhibitor. The corrosion rate was determined by weighing the sample after the test and converting its weight loss into a corrosion figure stated in inches of penetration per year. Results of a series of tests are tabulated below:

*Table I*

| | Additive | Corrosion Rate—Inches per year, Two-hour periods of boiling | | | |
|---|---|---|---|---|---|
| | | 1 | 2 | 3 | 4 |
| 1 | None—20% NaOH solution | 0.25 | 0.25 | 0.16 | 0.09 |
| 2 | NaNO$_3$ | 0.03 | 0.01 | 0.01 | 0.01 |
| 3 | Na$_2$CrO$_4$.4H$_2$O | 0.03 | 0.01 | 0.01 | |
| 4 | KNO$_3$ | 0.12 | 0.02 | 0.01 | |

The composition of the solution in cases 2, 3 and 4 was:

|  | Per cent |
|---|---|
| NaOH | 20 |
| m-Thiocresol | 3 |
| Additive | 1 |
| Water | 76 |

From the above table, it is clear that test 1 employing plain sodium hydroxide solution showed some diminution in the rate of corrosion after 8 hours of boiling.

For the evaluation of results of this sort, it should be noted that the corrosion which takes place in the first two hours of the test would be most significant, for a steam regeneration operation, which the boiling simulates, could be completed within that period. Accordingly, the valuable inhibitor would be one which immediately reduces the corrosion to a material extent.

Test No. 2, made with sodium nitrate, showed a reduced corrosion rate and only a limited amount of color and precipitate in the regenerated solution.

Sodium chromate in test No. 3 had the effect of reducing the corrosion rate, but, at the same time, appeared to accelerate the formation of color bodies and a heavy precipitate in the solution, so that its corrosion inhibiting value was more than canceled by the effect of developing color and precipitate in the solution. As a result, it can be considered that sodium chromate is relatively useless for the purpose.

Potassium nitrate in test No. 4 had the effect of reducing the corrosion rate and the additional value of keeping the solution clear and free of precipitate as well as did the sodium nitrate.

*Example 2.*—Another solution corresponding to the type which might be on hand for regeneration after a treating operation was made containing 20 per cent by weight of sodium hydroxide, 2.5 per cent of n-butyl mercaptan, 76.5 per cent of water and 1 per cent of additive and tested for its corrosiveness on a low carbon steel in the same manner as under Example 1. Results of a series of tests are tabulated below:

*Table II*

| | Additive | Corrosion Rate—Inches per year, Two-hour periods of boiling | | |
|---|---|---|---|---|
| | | 1 | 2 | 3 |
| 1 | None—20% NaOH solution | 0.14 | 0.21 | 0.14 |
| 2 | NaNO$_3$ | 0.14 | 0.02 | 0.01 |
| 3 | KNO$_3$ | 0.14 | 0.04 | |
| 4 | LiNO$_3$ | 0.06 | 0.01 | 0.01 |

The composition of the solution in cases 2, 3 and 4 was:

|  | Per cent |
|---|---|
| NaOH | 20.0 |
| n-Butyl mercaptan | 2.5 |
| Additive | 1.0 |
| Water | 76.5 |

The effect of different concentrations of the nitrate was determined by studying corrosion rates with solutions composed of: 20 per cent of caustic soda, 3 per cent of meta-thiocresol, nitrate and water to make 100 per cent. The results are tabulated below:

*Table II(a)*

| | Additive | Corrosion Rate—Inches per year, Two-hour periods of boiling | | |
|---|---|---|---|---|
| | | 1 | 2 | 3 |
| 5 | NaNO$_3$ 0.1% | 0.68 | 0.13 | 0.04 |
| 6 | NaNO$_3$ 0.5% | 0.14 | 0.04 | 0.02 |
| 7 | NaNO$_3$ 1.0% | 0.03 | 0.01 | 0.01 |
| 8 | NaNO$_3$ 2.0% | 0.03 | 0.04 | 0.01 |
| 9 | NaNO$_3$ 3.0% | 0.08 | 0.14 | 0.02 |
| 10 | NaNO$_3$ 4.0% | 0.06 | 0.02 | 0.03 |
| 11 | NaNO$_3$ 5.0% | 0.04 | 0.01 | 0.02 |

*Example 3.*—Another solution corresponding to the type of solution which might be on hand for regeneration after a treating operation was made containing 20 per cent by weight of sodium hydroxide, 2.5 per cent of butyl mercaptan, 76.5 per cent of water and 1 per cent of additive and tested for its corrosiveness on a low carbon steel in the same manner as under Example 1. Results of a series of tests are tabulated below:

Table III

| Additive | Corrosion Rate—Inches per year, Two-hour periods of boiling | |
|---|---|---|
| | 1 | 2 |
| 1  NaNO₃ 1% | 0.05 | 0.05 |
| 2  ----do---- | 0.06 | 0.02 |
| 3  ----do---- | 0.09 | 0.08 |

Similar tests were made with the solutions containing the same ingredients in the proportions: 20 per cent caustic soda, 2.5 per cent butyl mercaptan, additive and water to make 100 per cent; after 4 hours boiling of specimens with one per cent of additive in solution:

Table III(a)

| Additive | Corrosion Rate—Inches per year, Two-hour periods of boiling | | |
|---|---|---|---|
| | 1 | 2 | 3 |
| 4  NaNO₃ 0.1% | 0.02 | 0.01 | 0.02 |
| 5  NaNO₃ 0.4% | 0.01 | 0.03 | 0.01 |
| 6  NaNO₃ 0.7% | 0.02 | 0.01 | 0.01 |

In the application of sodium nitrate to plant operations, its peculiarities must be taken into account. First, it is not fully effective for inhibiting corrosion by alkali solutions which have picked up appreciable amounts of hydrogen sulfide and, as a consequence, have sodium sulfide in solution. Second, it can be used in small concentrations of the order of 0.1 per cent or less after it has been in the system handling the alkali solution for a time sufficient to develop a protective film in the equipment. This is attributable to the fact that the initial concentration of the nitrate puts a protective film on the surface of the metal, which a smaller concentration will easily maintain.

Pilot tests of the corrosion inhibiting value of the nitrates conducted in large scale equipment used in the sweetening of gasoline-hydrocarbons indicated results corresponding to those obtained on the laboratory scale. The results are summarized in Table IV.

Table IV

| Solution Tested | Additive | Corrosion Rate—Inches per year, Two-hour periods of boiling | | |
|---|---|---|---|---|
| | | 1 | 2 | 3 |
| 1  Pilot Plant Scrubber caustic 20% NaOH | none | 0.05 | 0.16 | 0.12 |
| 1a Pilot Plant Scrubber caustic 20% NaOH | 1% NaNO₃ | 0.05 | 0.13 | 0.03 |
| 2  Plant Regen. Caustic 20% NaOH | none | 0.11 | 0.08 | 0.10 |
| 2a ----do---- | 1% NaNO₃ | 0.29 | 0.05 | 0.01 |

The results reported in test #2 relate to a plant caustic solution which, in operations had picked up a small concentration of sodium sulfide.

From the description of the process it is clear that we have devised a way of avoiding corrosion of ferrous equipment by strong caustic solutions. Though specific examples given illustrate basically prevention of corrosion by solutions containing 20 per cent of caustic, we have found that about 0.01 to 5 per cent of alkali metal nitrate is effective to prevent substantially all corrosion by caustic solutions in concentrations up to 50 per cent. Practical considerations dictate the use of about one per cent or less of the inhibitor, or just sufficient to develop the beneficial result desired, for, to use much more would merely load the solution with an unnecessary ingredient.

The process has been described in connection with the regeneration of solutions used in extraction treatment operations for hydrocarbons, which entail vigorous steaming of the alkali solution to accomplish its regeneration. When an alkali treating solution is regenerated in such fashion, the equipment in which it is handled is subjected to the most extreme corrosion conditions. Where a solution has been used for the oxidative sweetening of hydrocabrons, such corrosive effect as it has on the ferrous equipment used in its regeneration can be minimized by means of the process described above.

Though specific illustrations of embodiments of the invention have been given, it is intended they be considered illustrative and not in a limiting sense for variations of the invention can be practiced without departing from the spirit or scope thereof.

What is claimed is:

1. The method of protecting ferrous vessels against corrosion during the boiling therein of caustic alkali solutions, containing about 5 to 50% of caustic alkali which have been used to extract sulfur compounds from hydrocarbons, in order to regenerate said solutions, comprising incorporating in the solution, as an inhibiting material, an alkali metal nitrate in amount sufficient to effect a material reduction in the corrosiveness of the solution.

2. Method in accordance with claim 1 in which the alkali metal nitrate is present in an amount of about 0.01 to 5.0 percent.

3. The method in accordance with claim 2 in which the corrosion inhibitor is sodium nitrate.

4. The method in accordance with claim 2 in which the corrosion inhibitor is potassium nitrate.

5. The method in accordance with claim 2 in which the corrosion inhibitor is lithium nitrate.

6. The method of protecting ferrous metal surfaces against corrosion by caustic alkali solutions containing about 5 to about 50 percent of alkali used for the sweetening of hydrocarbons during the regeneration thereof comprising, incorporating in the solution, as an inhibiting material, an alkali metal nitrate in amount sufficient to effect a material reduction in the corrosiveness of the solution.

7. In the method of regenerating spent alkali treating solutions substantially free of alkali metal sulfide but containing about 5 per cent to about 50 per cent of caustic alkali and a phenolic organic material, the steps involved in carrying out the regeneration to avoid substantial corrosion of ferrous equipment used in the handling thereof and the formation of color bodies and precipitates in the solution comprising, incorporating therein as a corrosion, color and precipitation inhibiting material an alkali metal nitrate in an amount sufficient to effect a material reduction in the corrosion, color formation and precipitation.

8. The method in accordance with claim 7 in which the solution contains about 0.01 to 5.0 per cent of the corrosion inhibitor.

9. The method in accordance with claim 8 in which the corrosion inhibitor is sodium nitrate.

10. The method in accordance with claim 8 in which the corrosion inhibitor is potassium nitrate.

11. The method in accordance with claim 8 in which the corrosion inhibitor is lithium nitrate.

GEORGE W. AYERS.
ERSKINE E. HARTON.
LOUIS R. MAZURK.

REFERENCES CITED

The following references are of record in the file of this patent:

UNITED STATES PATENTS

| Number | Name | Date |
|---|---|---|
| 1,772,618 | Schmidt | Aug. 12, 1930 |
| 1,804,463 | Erickson | May 12, 1931 |
| 1,876,837 | Battschart | Sept. 13, 1932 |
| 1,919,308 | Stauf | July 25, 1933 |
| 1,943,744 | Rosenstein | Jan. 16, 1934 |
| 2,015,038 | Pevev | Sept. 7, 1935 |
| 2,153,952 | Bayes | Aug. 11, 1939 |
| 2,207,566 | Waldeck et al. | July 9, 1940 |
| 2,297,621 | Henderson | Sept. 29, 1942 |

FOREIGN PATENTS

| Number | Country | Date |
|---|---|---|
| 1,013 | Great Britain | May 6, 1858 |
| 13,231 | Great Britain | Aug. 21, 1850 |

OTHER REFERENCES

Mellor: "Treatise on Inorganic and Theoretical Chem." (1922), Vol. II, page 804.